Oct. 3, 1939. D. H. MONTGOMERY ET AL 2,174,860
TOOL HOLDING DEVICE
Filed March 28, 1936 2 Sheets-Sheet 2
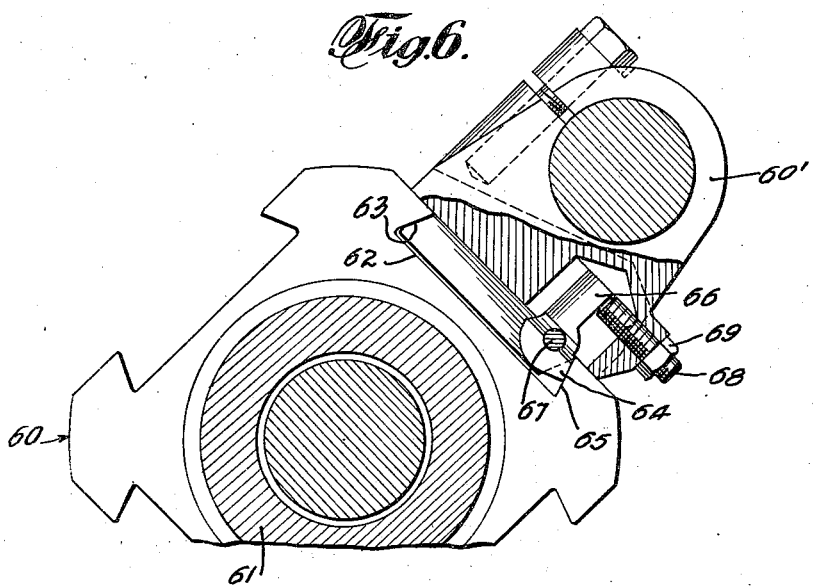
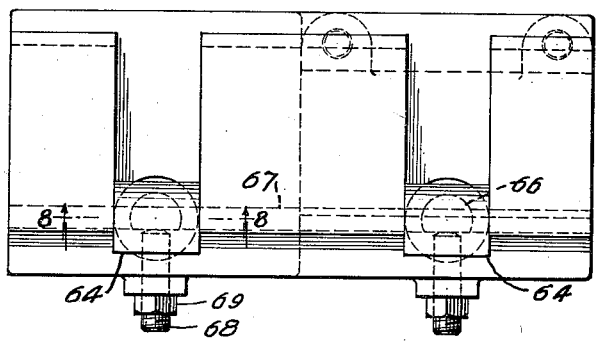
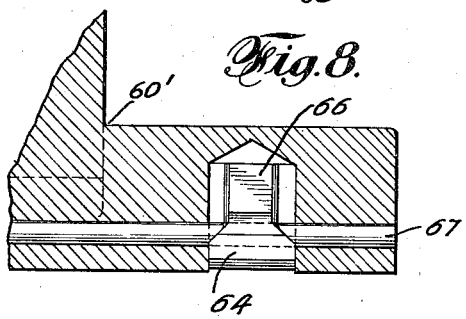
INVENTORS
DONALD H. MONTGOMERY
GEORGE A. CARDELL
BY
ATTORNEYS Patented Oct. 3, 1939

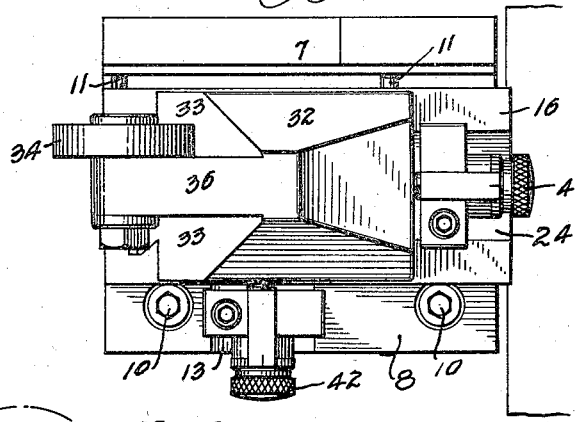

2,174,860

UNITED STATES PATENT OFFICE 2,174,860

TOOL HOLDING DEVICE

Donald H. Montgomery, Berlin, and George A. Cardell, New Britain, Conn., assignors, by mesne assignments, to The New Britain Machine Company, New Britain, Conn., a corporation of Connecticut Application March 28, 1936, Serial No. 71,428

7 Claims. (Cl. 82—24)

The invention relates to a tool holding device. Tool holders are usually held to their slides or supports by means of a dovetail slot connection and bolts, cap screws and the like which latter project and offer obstructions upon which chips may collect. Tools in general must be reground and for that purpose taken off of the machine. To again replace the tools in exact position requires considerable time and skill. Furthermore, the removal of tools from some types of slides or supports when they are held thereon by a dovetail connection is often a time consuming operation.

It is a general object of our invention to improve various features of tool holding devices.

It is a more specific object to provide a tool holding device which may be very securely held in place and yet readily removed when desired.

It is another object to provide simple, effective means for very securely holding a slide by means of a dovetail connection.

It is a further object to provide a tool holding device together with means for very accurately adjusting the same and which is readily removable and replaceable without disturbing the adjustment, thus materially reducing the down time of the machine when the tool is removed for grinding.

It is another object to provide a tool holding device in which the fit of the tool holder with its base may be very accurately adjusted so that when desired the tool holder may slide relatively to its base during cutting operations.

It is another object to provide a tool holder having a number of adjustments, all of which may be very accurately set.

Another object is to provide a slide so formed as to substantially prevent the lodgment of chips thereon.

Other objects and various features of invention will be hereinafter pointed out or will become apparent to one skilled in the art.

In the drawings which show, for illustrative purposes only, preferred forms of the invention—

Fig. 1 is a top plan view of a tool holding device illustrative of the invention;

Fig. 2 is a side view of the tool holding device of Fig. 1, parts being shown in section;

Fig. 3 is a rear end view of the tool holding device shown in Figs. 1 and 2;

Fig. 4 is a fragmentary enlarged sectional view taken substantially in the plane of the line 4—4 of Fig. 2;

Fig. 5 is a fragmentary enlarged sectional view taken substantially in the plane of the line 5—5 of Fig. 3;

Fig. 6 is an end view, parts being broken away, of a tool holding device on a different type of tool slide;

Fig. 7 is a bottom plan view of the tool holding device shown in Fig. 6; and

Fig. 8 is a sectional view taken substantially in the plane of the line 8—8 of Fig. 7, said section being viewed with the holding device turned right-side up.

Briefly stated, in a preferred form of the invention we employ a slide, such as a cross slide or a slide for end working tools, and upon this slide is mounted a tool holder. The tool holder and slide have interfitting parts for securing the two together and permitting adjustment between the slide and the tool holder. The connection between the two is adjustable, so that the fit between the two or the relative security with which the two are held together may be very accurately and readily adjusted, so that if the tool holder is designed to slide relatively to its supporting slide during operation, the fit may be properly adjusted for that purpose and on the other hand, if the tool holder is to be rigidly secured to its slide, the parts may be rigidly secured together. The connection, preferably in the form of a dovetail connection between the tool holder and support, is so arranged that the tool holder may be removed transversely of the slot, that is, without sliding the dovetail out of the dovetail slot. We preferably provide also various adjusting means whereby the tool may be very accurately positioned and furthermore the tool may be removed for grinding and replaced in the exact position that it occupied before removal. The parts are so arranged as to tend to prevent the lodgment of chips thereon.

In the drawings Figs. 1 to 5 indicate a tool holder carried by a cross slide, while Figs. 6 to 8 illustrate a tool holder carried on a longitudinal or Gridley type of tool slide.

In the form shown in Figs. 1 to 5, 5 indicates a rigid bearing stud carried by the frame of the machine and serving as the slide support for a cross slide 6, all as is more fully set forth in Gridley et al. application, Serial No. 551,136, filed July 16, 1931. The cross slide 6 is fed on its stud 5 by cam means (not herein shown) and is guided against rotation on the stud 5 by means of an upstanding arm 7, having interengagement with the frame, not herein shown but illustrated in said Gridley et al. application.

A base plate 8 rests on the cross slide 6 and in the form shown is pivoted thereto, as by means of a stud 9. The base plate 8 is rigidly held to the cross slide by means of screws 10—10, having a loose fit in the counterbored openings in the base plate 8, so that the latter may be adjusted angularly to a slight extent about the stud 9 as a pivot. In order to adjust the plate 8 angularly on the cross slide 6 the plate may be bored for the reception of a pair of adjusting pins, such as 11, which engage an upstanding part of the slide 6, as will be clear from Fig. 3. A headless screw 12, engaging a threaded opening in the base plate 8, serves to force the adjusting pins 11 into engagement with the slide 6 and by adjusting the screws 12 the angular position of the base plate 8 on the cross slide may be vary accurately determined, after which the screws 10 may be tightened up and the base 8 will then be securely held in its adjusted position on the slide 6.

The base plate 8 is provided with a dovetail slot 13, having undercut surfaces 14—15. A supplementary base plate 16 fits flatwise on the base plate 8 and is provided with parts to interfit with the slot 13. In the form shown the supplementary slide 16 is provided with a projection 17, having a dovetail portion 18 to interfit with the side 14 of the dovetail slot. The slide 16 adjacent the side 15 of the slot carries a clamping member having a nose 19 to engage the angular side 15 of the dovetail slot and an upstanding ear 20 to be engaged by a pin 21 and adjusting screw 22. The clamping member is pivoted, as on a pin 23 extending into the projection 17 at opposite sides of the clamp, that is to say, the projection 17 constitutes in effect a long dovetail to fit in the dovetail slot 13 and the projection 17 is transversely slotted and the slide 16 apertured to a sufficient extent to house the clamping member.

It will be seen that with the parts positioned as shown in Fig. 5 when the adjusting screw 22 is turned up the pin 21, engaging the ear 20, will rock the clamping member and cause the nose 19 thereof to press upwardly on the dovetail slot surface 15. This action causes the dovetail portion 18 to wedge down on the surface 14 and cause the supplementary base 16 to very tightly engage the upper surface of the base 8. At the same time the nose 19, acting upwardly against the dovetail surface 15, further serves to draw down the interfitting surfaces between the slides 8 and 16. The holding force between the two slides 8 and 16 is very readily determined by the screw 22 and it has been found that it is a relatively simple and effortless matter to rotate the screw 22 to cause the plates 8 and 16 to be gripped with the greatest security.

The plate 16 is provided on top with a dovetail groove 24 (Fig. 4), positioned at right angles to the slot 13 in the base 8 upon which it fits. A tool holder 25 fits flatwise on the slide 16 and is provided with a projection 26, having a dovetail surface 27 to interfit with the adjacent side of the dovetail slot 24. At the side opposite the surface 27 there is a clamping member including a clamping nose 28 and an ear 29, said member being pivoted, as heretofore stated in connection with Fig. 5, on a pin 30 and adjustable by means of a clamping or adjusting screw 31, as has been heretofore described. The tool holder 25 may thus be held very securely and rigidly but adjustably on the plate 16.

The tool holder is generally slabbed off, as indicated at 32—32, on the sides and at 33 on the front and the surfaces of the plate are likewise slabbed off, so that there is little likelihood that chips will lodge upon the surface of the tool holder or the parts upon which it is carried. The tool itself in the form shown is a circular forming tool 34, secured as by means of a bolt 35 to a forwardly projecting flange member 36 on the tool holder 25.

It will be seen that since the base plate 8 can be angularly adjusted the tool 34 carried thereby is also capable of angular adjustment. Furthermore, the tool 34 may be moved longitudinally of the work by reason of the dovetail connection shown in Fig. 5 and the tool may be moved transversely of the work by means of the dovetail connection illustrated in Fig. 4. All of these movements are adjusting movements and are, of course, independent of the main feeding movement of the tool slide.

The parts may be vary accurately adjusted by very simple means. The adjusting means, that is, for the slide 16 on the slide 8 and the tool holder 25 on the slide 16, may comprise an adjusting block 36, having a dovetail 37 to engage within the dovetail slot, such as 13 or 24. The lower portion of the adjusting block 36 may be slotted, as indicated at 38, and the screw 39 threaded into the lower portion 40 may serve to draw up on the portion 40 and adjustably but rigidly clamp the adjusting block 36 in place in the slot and adjacent to the tool holder or part to be adjusted. The adjusting block 36 carries an adjusting screw 41 and an adjusting thumb nut 42, the latter being held in adjusted rotative position by means of a spring finger 43, engaging in various notches in the periphery of the thumb nut 42, as will be understood.

The thumb nut 42 carries a projecting pin 44 mounted eccentrically therein and the screw 41 has an eccentric hole therein to slidably receive the pin 44. The thumb nut 42 is sustained against longitudial movement by a transverse pin 45 engaging in a circumferential groove in the shank, so that when the thumb nut is turned it does not move longitudinally but by means of the eccentric pin 44 slidably fitting the hole in the screw 41 the latter is rotated and advanced or retracted for adjusting the position of the tool.

The tool holder 25 or the part to be adjusted may be moved to approximate position and very lightly tightened. The final adjustment may then be accomplished by securing the block 36 in approximate position and then turning the thumb nut 42 so as to cause the screw 41 to very slowly move the part, such as the tool holder, to be adjusted. When adjustment has been effected the tool holder is rigidly clamped in place by means of the clamping screw 31, as heretofore described. The adjustment for the plate 16 on the plate 8 may be identical with the adjusting means just described and no separate description thereof need be given.

Since the dovetail slots and dovetails are all preferably of the same size the various dovetails are interchangeable with the various dovetail slots and the various adjusting means are interchangeable and may be used in any of the dovetail slots.

After the parts have been once properly adjusted and it later becomes necessary to remove the tool for regrinding, the adjustment need not be at all disturbed. The clamping screw 31 is merely backed off and the tool holder 35 carrying the tool 34 with it is simply rocked, that is, by raising the side where the screw 31 is located the tool holder will pivot on the plate 16 about the point 50 and the nose 28 will slip out of the dovetail slot 24. When the tool has been reground the tool holder may be replaced by rocking the same into place and by backing the tool holder into the adjusting screw 41 and then turning up on the clamping screw 31 it is assured that the tool holder will be in the same position it was in before removal.

It is to be understood that, aside from the adjusting nuts 42, all of the clamping screws, etc., are housed or not projecting, so that the device may be said to be in effect streamlined, so that chips will readily fall away from the tool and down into the chip pan.

In the form shown in Figs. 6, 7 and 8 the slide 60 is of the Gridley type for end working tools. The slide 60 is mounted for sliding movement on a stem 61, carried by and projecting from the spindle carrier, all as is more fully set forth in said Gridley et al. application. The slide is provided with a plurality of dovetail slots 62, depending upon the number of end working tool positions desired. An end working tool holder 60' fits on the flat side of the slide 60 and is provided with a projection having a dovetail 63 to interfit with one side of a dovetail slot 62, as heretofore described. The tool holder at the side opposite the dovetail 63 is provided with a clamping member having a nose 64 to engage the opposite side 65 of the dovetail slot. An upstanding ear 66 on the clamping member, which is pivoted on a pin 67, is engageable by the clamping screw 68, so that when the clamping screw 68 is turned up the slide 63 will be very rigidly held on the slide 60, as heretofore described. By backing off on the screw 68, also as heretofore described, the tool holder 63 may be removed from the slide 60 by rocking the same off transversely. For an end working tool which is to be rigidly secured to the slide 60 a single clamping means will ordinarily suffice, the same as in connection with a forming tool heretofore described. However, it is frequently desirable to feed an end working tool independently of the feed of the main slide 60, in which case the slide 60 becomes a way or guide for the slide 60'. When the slide 63 is to be fed independently it is preferable to provide a plurality of separated clamping members, as is illustrated in the bottom plan view of Fig. 7. By adjusting the clamping screws 68 just the desired nice sliding fit may be obtained between the slide 60 and the tool holder 63. When that fit has been obtained the clamping screw 68 may be held in position by means of lock nuts 69. When a plurality of clamping members are employed they may all be mounted upon a single pivot pin 67, as will be apparent from Fig. 7.

It will thus be seen that we have provided very simple yet sturdy and effective clamping means for a tool holder or the like. We have furthermore provided a means for very readily removing a tool holder from its support and without disturbing any of the adjustments of the various parts and the tool holder may be replaced in the exact position from which it was removed. A great deal of time is thus saved each time a tool is to be reground.

The entire device is so designed as to be relatively free of chips and since all the parts are simple and sturdy there is little likelihood of any of the parts getting out of order.

While the invention has been described in considerable detail and as applied to a tool holding device, it is to be understood that the principles of the invention are applicable to the holding of members other than tool holders and furthermore that various changes and modifications may be made within the scope of the invention as defined in the appended claims.

We claim:

1. In a device of the character indicated, a member having a dovetail slot therein, and a second member to be clamped to said first member and having a dovetail projection to fit one side of said dovetail slot, the opposite side of said projection being slabbed off to clear the adjacent side of said slot whereby said members may engage with each other by first engaging said dovetail with said one side of said dovetail slot and rocking said members toward and into engagement with each other, said second mentioned member having means carried thereby opposite said dovetail projection engageable with the adjacent inside surface of said dovetail slot for forcing said dovetail projection into engagement with its coacting slot and forcing said second mentioned member down on said first mentioned member at the side opposite said dovetail projection.

2. In a device of the character indicated, two members, one of said members having a dovetail slot therein and the other of said members having a dovetail projection within said slot, and pivotally mounted means carried by one of said members for adjusting the fit between said dovetail slot and dovetail projection.

3. In a device of the character indicated, a member having a dovetail slot, a second member to be secured thereto and having a projection with a dovetail to interfit with one side of said dovetail slot, a rocking member pivotally mounted on said second mentioned member and having a nose to interfit with the opposite side of said dovetail slot, and adjusting means for rocking said rocking member to cause said projection to engage the adjacent side of said dovetail slot for drawing said two members into tight engagement with each other.

4. In a device of the character indicated, a member having a dovetail slot therein, a second member fitting flatwise on said first mentioned member and having a projection thereon, said projection having a dovetail to interfit with one side of said dovetail slot, a rocking means pivotally mounted on said second mentioned member adjacent the opposite side of said dovetail slot and having a nose to engage the adjacent side of said dovetail slot, and an actuator for said rocking means to rock the same and cause said two members to be tightly gripped relatively to each other.

5. In a device of the character indicated, a base member, a tool holder member, said members having an interfitting dovetail connection with each other for slidable movement relatively to each other, means for adjusting the position of said members relatively to each other in the longitudinal direction of said dovetail connection comprising an adjusting block adjustably secured to the dovetail connection part of one of said members, and an adjusting member interposed between said adjusting block and the other of said members for adjusting the position of said two first mentioned members relatively to each other in the direction longitudinally of said dovetail connection.

6. In a device of the character indicated, a base member having a dovetail slot therein, a tool holder member having a dovetail to interfit with said slot whereby said members are slidable relatively to each other, means for adjusting said members relatively to each other in a direction longitudinally of said dovetail and slot including an adjusting block, means for adjustably securing said block within said dovetail slot, said last mentioned means being independent of said tool holder, and a screw carried by said adjusting block and engageable with said tool holder member for adjusting said members relatively to each other in a direction longitudinally of said dovetail and slot.

7. In a device of the character indicated, a slide member, a base plate pivotally mounted thereon for angular adjustment, independent members interposed between said slide member and base plate and on opposite sides of said pivotal mounting for adjusting the angular position of said base plate on said slide, and a tool holder carried by said base plate.

DONALD H. MONTGOMERY.
GEORGE A. CARDELL.